(12) United States Patent
Mihm et al.

(10) Patent No.: US 7,809,836 B2
(45) Date of Patent: *Oct. 5, 2010

(54) SYSTEM AND METHOD FOR AUTOMATING BIOS FIRMWARE IMAGE RECOVERY USING A NON-HOST PROCESSOR AND PLATFORM POLICY TO SELECT A DONOR SYSTEM

(75) Inventors: James T. Mihm, Gresham, OR (US); William R. Hannon, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 10/821,037

(22) Filed: Apr. 7, 2004

(65) Prior Publication Data

US 2005/0229173 A1   Oct. 13, 2005

(51) Int. Cl.
G06F 15/16 (2006.01)
G06F 15/173 (2006.01)
G06F 15/177 (2006.01)

(52) U.S. Cl. ............... 709/227; 713/2; 713/100

(58) Field of Classification Search .......... 713/100, 713/1, 2; 714/5, 15; 717/168, 171; 709/200–203, 709/217–228
See application file for complete search history.

(56) References Cited

U.S. PATENT DOCUMENTS

| | | | | |
|---|---|---|---|---|
| 6,367,007 B1 * | 4/2002 | Do | | 713/2 |
| 6,990,577 B2 * | 1/2006 | Autry | | 713/100 |
| 7,136,994 B2 * | 11/2006 | Zimmer et al. | | 713/2 |
| 7,293,165 B1 * | 11/2007 | Tobias | | 713/1 |
| 2004/0098521 A1 * | 5/2004 | Lin | | 710/72 |
| 2004/0260936 A1 * | 12/2004 | Hiray et al. | | 713/200 |
| 2005/0038808 A1 * | 2/2005 | Kutch | | 707/102 |
| 2005/0228888 A1 * | 10/2005 | Mihm et al. | | 709/227 |
| 2005/0240669 A1 * | 10/2005 | Khanna et al. | | 709/225 |

OTHER PUBLICATIONS www.intel.com/design/servers/impi, Intelligent Platform management interface (IPMI), Aug. 16, 2008, pp. 1-6.*
L440GX+, Lancewood Server, Baseboard Management Controller, Frimware version 1.07, Nov. 24, 1999.*

* cited by examiner

*Primary Examiner*—Haresh N Patel
(74) *Attorney, Agent, or Firm*—Joni D. Stutman

(57) ABSTRACT

An embodiment of the present invention is a system and method relating to automatic firmware image update by proxy for BIOS or other embedded firmware image. When a server equipped with a baseboard management controller (BMC) and detects that its BIOS code image is corrupted or out of date, it may broadcast a request for an image update over an out-of-band network. One or more donor systems on the network may respond to the request and send the requestor a new image. The recipient system uses management policies to determine from which donor system to accept an update. In another embodiment, the BMC retrieves a new BIOS image from a predetermined location and updates the BIOS image accordingly.

31 Claims, 4 Drawing Sheets

SYSTEM AND METHOD FOR AUTOMATING BIOS FIRMWARE IMAGE RECOVERY USING A NON-HOST PROCESSOR AND PLATFORM POLICY TO SELECT A DONOR SYSTEM

CROSS-REFERENCE TO RELATED APPLICATION

The present application is related to U.S. patent application Ser. No. 10/820,532, entitled "SYSETEM AND METHOD FOR AUTOMATING FIRMWARE IMAGE RECOVERY FOR SERVER MANAGEMENT OPERATIONAL CODE (as amended)," to J. Mihm and W. Hannon and assigned to the assignee of the present invention (and filed concurrently herewith).

FIELD OF THE INVENTION

An embodiment of the present invention relates generally to network computing and, more specifically, to an automatic firmware update proxy for a server BIOS Image, where valid BIOS images are retrieved over a network, and updated by an independently operating baseboard management controller.

BACKGROUND INFORMATION

Various mechanisms exist for out-of-band (OOB) server management. A typical server today contains both a Baseboard Management Controller (BMC) and a system Basic Input Output System (BIOS). These processes both typically execute code from flash memory devices. The BMC and BIOS have separate code images, typically located in separate flash devices. The images contained in flash have a minimum of two sections of code: a boot block section and an operational code section. The boot block is typically write-protected and is not updated in the field. Conversely, the operational image can be updated in the field. In existing systems, the BIOS image can only be updated if the system has booted to an operating system. If a BIOS image upgrade is corrupted or faulty, the system is unable to boot to the operating system and is rendered inoperable.

Typically a management console or system communicates with the baseboard management controller (BMC) of a server on a network. The OOB communications have the advantage of being able to communicate with the server when it is not booted up. The BMC typically operates on standby power, even when the server is not technically powered on. This enables the management console to access power operations, temperature and other data from sensors communicating with the server BMC. If the temperature of the server is too hot, for instance, the management console can prevent a power up, or initiate a shutdown prior to the server overheating.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to an automatic firmware update proxy. A method and apparatus is described for having a Baseboard Management Controller (BMC) act as a proxy agent for updating the Basic Input Output System (BIOS) image. In one embodiment, the BIOS is updated by the BMC while the system is powered on and held in a reset state (i.e., the processor is not executing code). The BIOS image may be obtained by the BMC from a remote management console, a nearby donor system, or a locally stored image. In another embodiment, the BMC proxy may update an operational image for other embedded processors in the system.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
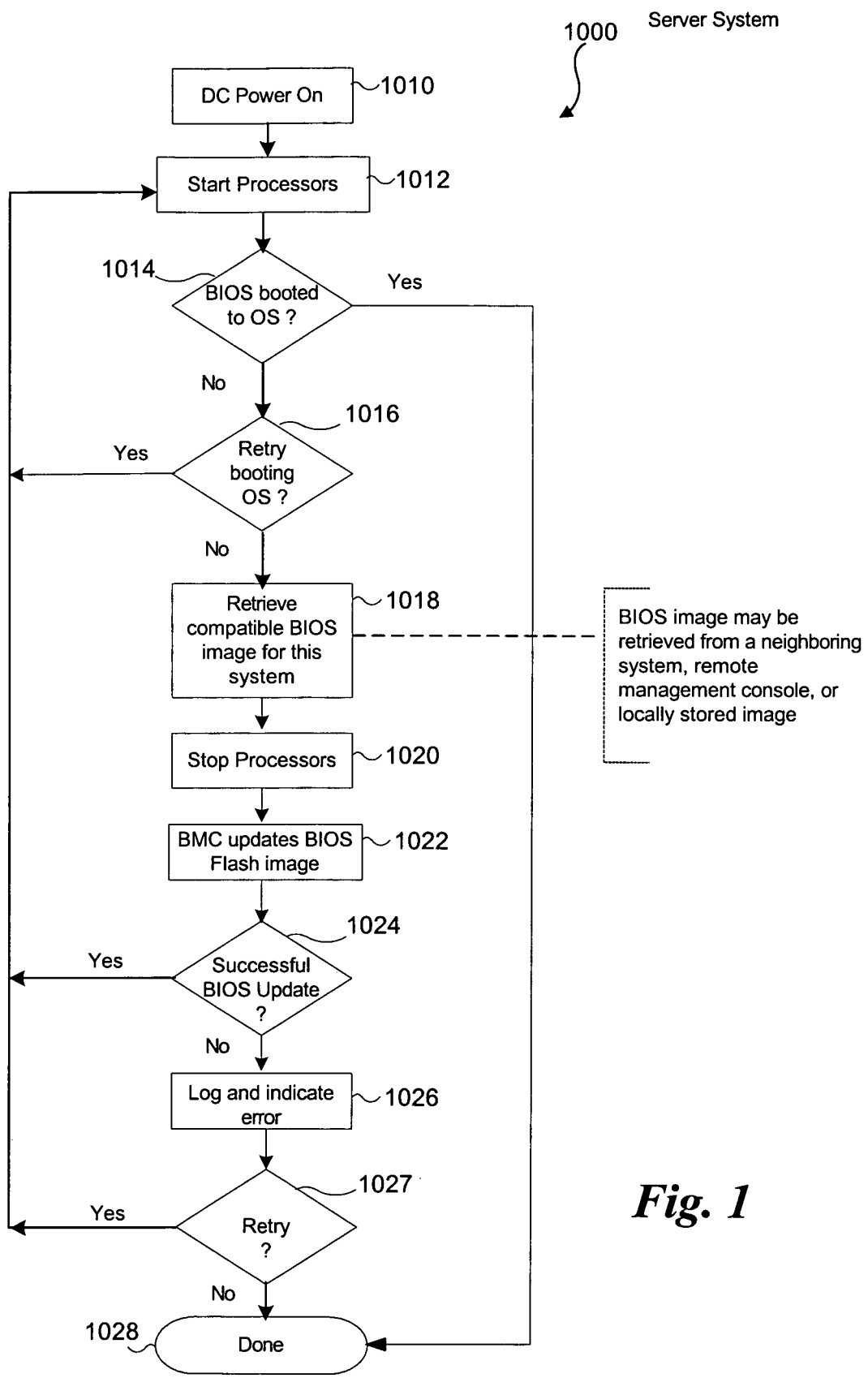
FIG. 1 is a flow chart illustrating an exemplary method for updating a system BIOS with a Baseboard Management Controller (BMC) proxy, according to one embodiment of the invention.

FIG. 1 is a flow diagram illustrating an exemplary method 1000 for updating a BIOS using a BMC proxy. In one embodiment, when a server is powered on (1010) the processor(s) are started (1012). In existing systems, the system must be fully powered and the OS must be running in order to update the BIOS. In one embodiment, the BMC requires the system to be powered on to complete a proxied update. A determination is made as to whether the BIOS has booted to the operating system (OS) in block 1014. If so, the process returns (1028). If not, a decision is made regarding whether to make another attempt to boot to the OS in block 1016. If another attempt is to be made, then the process continues at block 1012 and restarts the processor(s). If all allowable attempts to boot the system fail, then the BIOS is assumed to be corrupted and requires an update. In existing systems, updating the BIOS once it has failed is a cumbersome process.

In existing systems, recovering a failed BIOS requires the system chassis to be opened and a physical jumper on the board to be moved. The system must then be rebooted with a floppy disk (or other recovery media). The user is notified by beep sounds indicating start and finish of the process. Then the server must be opened again, and the recovery jumper replaced in its original position. In addition, this method of recovery requires an intact BIOS boot block. In an embodiment of the system and method as described herein, a corrupt BIOS boot block may be updated or recovered. In another embodiment, an update may be requested even if booting to the OS will not fail, i.e., the BIOS is not corrupted, but perhaps, merely out of date. In this embodiment, a determination is made regarding whether to update a functional BIOS in blocks 1014 and 1016.

If an update is required, a compatible BIOS image is retrieved by the BMC to update the BIOS firmware in block 1018. The BIOS image may be retrieved from a variety of locations, including a neighboring system, remote management console, and/or locally stored image. A locally stored image may be stored in non-volatile storage on a Universal Serial Bus (USB) device, or a Personal Computer Memory Card International Association (PCMCIA) flash card, or other non-volatile storage device accessible by the BMC. One embodiment uses a method as described in concurrently filed U.S. patent application Ser. No. 10/_____) entitled "AUTOMATIC FIRMWARE IMAGE RECOVERY" to J. Mihm and W. Hannon. In other embodiments, the image may be sent to the BMC with an update command, or automatically retrieved from a specific server or location by the BMC. It will be apparent to one of ordinary skill in the art that a variety of methods may be used to retrieve a valid BIOS image.

Once the image has been retrieved, the processors are stopped and put into a "reset" state in block 1020. The BMC updates the BIOS flash image in block 1022, as described in more detail below. In one embodiment, the BMC is operatively coupled to the BIOS flash via a low pin count (LPC) bus and Super Input/Output (SIO) controller. This connection may only be available if the system is completely powered up. Other interfaces may be used to update the BIOS flash by the BMC, including existing standard or proprietary connections. A connection may be used that uses standby power, as does the BMC. In this embodiment, the system does not need to be fully powered and the OS need not be running for the BMC to update the BIOS image. In another embodiment, the BIOS memory is located on the same component (or flash card) as the BMC. This embodiment does not require the system to be fully powered to complete an update. If the BIOS image has been updated correctly, as determined in block 1024, control returns to block 1012 to start the processors. If the BIOS has not been updated correctly, an error is logged and a notification may be sent to an administrator or operator in block 1026. If there has been an error, a determination may be made whether to retry the update process in block 1027. If retry is to be made, then the process continues at block 1012. If not, the process returns at block 1028 and execution continues. If the update failed, a recovery policy may be implemented based on the preferences of the system administrator or operator.

In one embodiment, the system does not boot to the OS. The BIOS image is updated with either DC power turned on, while the processors are stopped, or when DC power is turned off. In order to update the BIOS image when DC power is off, the storage subsystem holding the BIOS image must be powered off and running only on standby power. The appropriate process is hardware implementation specific. If the BIOS successfully boots to the OS, and there is no request to update the BIOS image, then the update proxy phase is complete.

In one embodiment, the BIOS is to be updated before failing, for instance to deploy a bug fix, or to add a new feature. In this case, a message may be sent to the BMC notifying it of the update. If the system is not running, the BMC may update the BIOS using any embodiment that does not require a full power on. If the system is running, various policies may be used to determine whether the BMC should update the BIOS flash and restart the system or wait until a next boot time.

Figure 2:
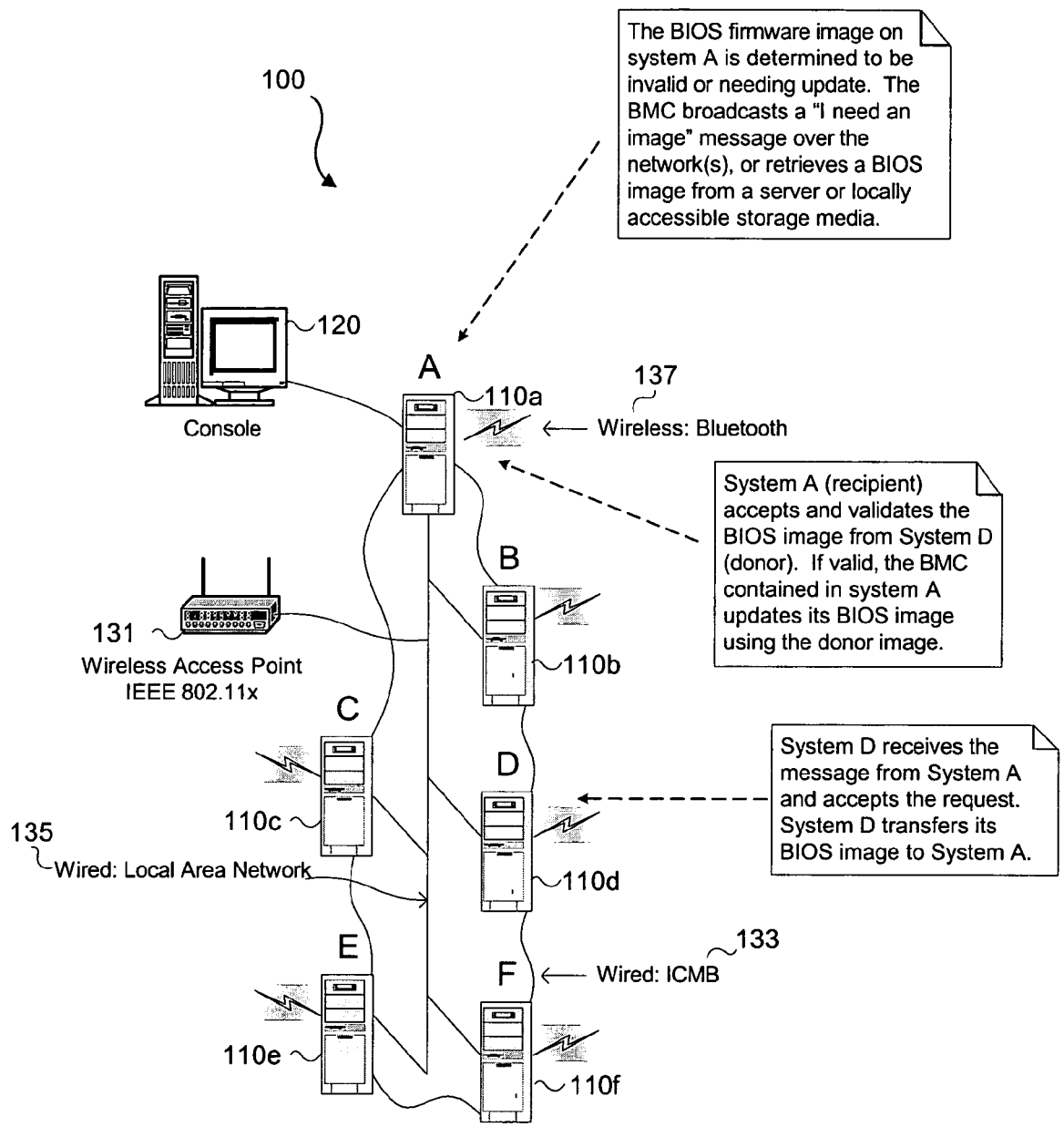
FIG. 2 is a block diagram illustrating an exemplary network of servers according to an embodiment of the invention.

FIG. 2 is a block diagram illustrating an exemplary network of servers according to an embodiment of the invention. Network 100 may include a variety of servers 110*a-f*, a management console 120, and a wireless access point 131 using, for example, the Institute of Electrical and Electronics Engineers (IEEE) 802.11x communication protocol. Additional information regarding IEEE standards is available publicly, for instance at http://standards.ieee.org/. The servers may be communicatively coupled via a wired inter-chassis management bus (ICMB) 133 or typical Ethernet local area network (LAN) 135, a wireless 802.11x protocol via a wireless access point 131 or Bluetooth 137, network or any combination of the above.

In one embodiment, it is determined that the BIOS firmware image on server A 110*a* requires an update, possibly because it is invalid or corrupted. For purposes of this discussion, the system with the corrupted BIOS code which broadcasts a request for verified code is called the "recipient" system. The responding system is called the "donor" system. Server 110*a* may broadcast a message over one or more of the available networks. In one embodiment, the system administrator may pre-select which types of networks may be used to broadcast this message. The message sent by server A 110*a* is a request for a new BIOS firmware image. The message typically includes data identifying the requesting server (recipient) which may include the server's IP address and/or a digital signature, the version of BIOS firmware image requested and server type. In some embodiments, the recipient server may also send other information such as to identify the existing problem, an identifier for a preferred donor, and/or authentication information.

Server A 110*a* may broadcast its message request via a LAN, or other communication channel. In existing systems, there is often no network capability in the BMC boot block because it adds complexity to the code. However, the BMC may have access to its own network interface card (NIC). If the boot block of server A 110*a* has network capability in its boot block, then it may broadcast the request through the OOB connection, also.

In one embodiment, the network server to be managed is compatible with the Intelligent Platform Management Interface (IPMI). The IPMI is a communication protocol for LANs or modem communication to a baseboard management controller (BMC). The IPMI 1.5 specification, jointly developed by Intel Corporation, Hewlett-Packard Company, NEC Corporation and Dell Computer Corporation, for instance, defines a mechanism by which an Out-Of-Band (OOB) connection can pass data back and forth across a variety of networks via the BMC. Information regarding the IPMI 1.5 specification is publicly available and may, for example, be found on the Internet, specifically on the web site of Intel Corporation at http://developer.intel.com/design/servers/ipmi. In existing systems, Server Management Software (SMS) uses the IPMI mechanism to determine the operating system (OS) version of the server as well as to perform a shutdown of the OS remotely. These actions are typically performed through the use of an OS resident agent, such as Intel® Server Management, called Platform Instrumentation (PI).

As discussed above, the recipient server's NIC may be capable of communicating over any type of network. FIG. 2 shows a wireless LAN or 802.11, Bluetooth®, and a wired ICMB. An ICMB is an RS485 communication channel. This type of channel is defined in the IPMI 1.5 specification. The request message transmission protocol will depend on which communication channel is selected and is defined by the IPMI specification. The content of the message is implementation dependent. It will be apparent to one of ordinary skill in the art that many message formats may be implemented. Part of the message may identify specifics about the needed BIOS code, e.g., version or model or part number, etc. In the example shown in FIG. 2, the message is transmitted over a network to systems 110*b-f*, as well as the management console 120. The first system to respond may be the one to negotiate. In another embodiment, there is a policy on the corrupted machine to decide with whom to negotiate. The policy will typically pick the best match. It will be apparent to one of ordinary skill in the art that there are multiple ways to implement this. In one embodiment, the recipient system may want to accept a previous version of the BIOS image because a version update is what corrupted it. This preference may be configured as a policy.

The IPMI specification does not define a set of commands for firmware updates. Firmware update commands are OEM (original equipment manufacturer) specific commands which are available via any interface according to the BMC specification. In existing systems, the firmware update commands are proprietary for specific hardware. The BMC only gets a small set of data from the OS, and currently those commands are proprietary. In state of the art systems there is no way to update the firmware via OOB connections when the BIOS code is corrupted. The BMC sends commands to the OS, i.e., get the OS version number, perform graceful shutdown, initiate reset, etc. The OS may obtain information from the BMC. The IPMI specification defines multiple interfaces for communication with the BMC and for getting information that the BMC provides. The BMC has a host interface which is what BIOS and OS use to communicate to the BMC. The host interface is defined in the IPMI standard. A local area network (LAN) can be used to communicate with the BMC through OOB where the network has information that is directly routed to the BMC. This communication may be over serial, dial up modem or other direct serial connection. IPMB (intelligent platform management bus) allows another device within the server itself to exchange information with the BMC such as an intelligent hotswap backplane, such as a small computer system interface (SCSI) redundant array of independent disks (RAID) backplane. The intelligent chassis management bus (ICMB) is a way of connecting BMCs together so the BMCs can exchange information. It is a private management network. These interfaces typically share essentially the same command set, but use different protocols for the transport mechanism, e.g., serial (basic or point to point protocol (PPP) or terminal mode) or LAN using User Datagram Protocol (UDP), Transfer Control Protocol (TCP), remote mail checking protocol (RMCP) or ICMB, IPMB, etc., but the actual message data is the same. In embodiments of the present invention, various proprietary connections and interfaces may also be used.

Figure 3:
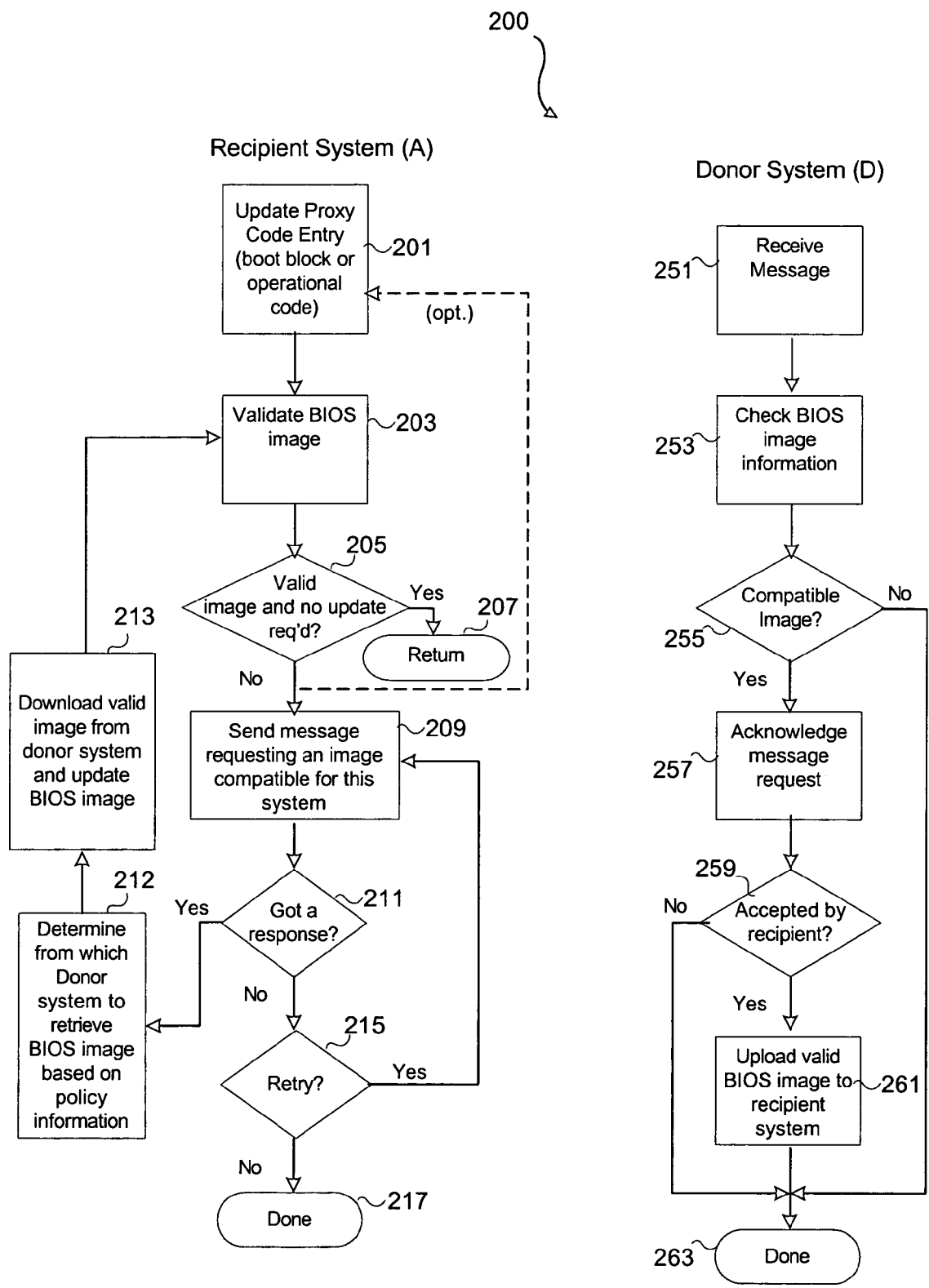
FIG. 3 is flow diagram illustrating an exemplary process for requesting and receiving a firmware update image for both a donor and recipient system, according to an embodiment of the invention.

Referring now to FIG. 3, there is shown a flow diagram 200 of the interaction between recipient systems and donor systems, according to an embodiment of the disclosed system and method. The recipient system 110a enters or executes its update proxy code, typically upon startup, in block 201. The BMC may execute its update proxy code in either the boot block or the operational code. The recipient system examines/validates its BIOS image in block 203, or determines whether an update is required. The BIOS image is then scanned and validated. A device information block (dib) may be identified and signature verified. If the signature is not found, then the BIOS image is assumed to be bad. A checksum or cyclic redundancy check (CRC) may also be compared. If the BIOS image is valid and not scheduled for an update, then the OS is allowed to be booted in 207. If the image is bad then the BMC may initiate a soft reset and return control back to the beginning of the update proxy 201 to try again. However, if there is malicious firmware intentionally sabotaged, then the BMC may not get be able to reboot from the boot block if rebooting depends on the operational code. The boot block update proxy code may attempt to boot the BIOS code a specified number of times before declaring it to be corrupted/defective. The boot block update proxy code may use a variety of known techniques for determining whether the image is valid.

Again, if the image is valid and an updated image is not required, as determined in block 205, then the operational code is loaded and the recipient system continues to boot in block 207. If the recipient system verifies that its BIOS code is corrupt or bad, and rebooting is not an option or maximum reboots have been attempted, the BMC may broadcast a message declaring that it needs a new BIOS code image in block 209. Other "donor" systems (110b-f and 120) on the communication network may receive the broadcast message (block 251) and validate the received request to see if the request matches their parameters. For instance, the donor system may check to see if the requested BIOS version matches the version of BIOS code in its repository. In another embodiment, the donor system may compare policy parameters to determine if it is the preferred provider of the BIOS image. The donor system checks the BIOS image information for any images in its possession in block 253. If the donor system does not have a compatible image, as determined in block 255, then it may ignore the request and continue to operate normally (block 263). In one embodiment, the donor system sends an acknowledgement message that declares the receipt of the broadcast message with a failure code meaning that no compatible image is present. In one embodiment, a broadcast message specifically targets one or more servers or a management console. In one embodiment, the message targets any compatible system, i.e., one that is used as an image repository and has the appropriate image. If the message is validated by the donor system, the donor system offers the image with a positive acknowledgment message in block 257. The recipient computer may have a policy to choose which offer to accept, if there is more than one offer. In one embodiment, an offer from a management console will be accepted ahead of all other offers. In another embodiment, an offer of a more recent version is preferred, and multiple donors with the same version may be chosen based on proximity to the recipient system. In yet another embodiment, the BIOS image is retrieved from a predetermined location or donor. It will be apparent to one of ordinary skill in the art that a variety of policies may be implemented on one or both of recipient and donor system.

The recipient determines whether an acknowledgement is received in block 211. The recipient system will also follow policy directives to determine which response to accept and send an acceptance message to the desired donor system in block 212. The policy may be as simple as taking the first proffered image, or may be more complicated as discussed above. The donor system determines whether its offer has been accepted in block 259. If so, the donor system uploads the valid image to the recipient system via whatever communication mechanism has been chosen, in block 261. In one embodiment, the message exchange may use a different communication channel than the image upload. Once the transfer is negotiated and the BIOS code image is transferred to the recipient computer, the BIOS firmware is written over with the new image in block 213, where the recipient system validates the BIOS image as before in block 203. If the recipient system does not receive a proper reply from a donor system, as determined in block 211, it may retry broadcasting a message searching for an image to update. In another embodiment, if a reply is not received, the BMC may retrieve a compatible image from a predetermined local or network storage location. If retry mode is enabled, a determination is made as to whether a maximum number of retries has been reached in block 215. If the maximum has not been reached, then another message is sent requesting an update (block 209). If another retry is not warranted, the process may be terminated in block 217 and updating the BIOS image will typically involve user intervention, as the automatic proxied update did not complete successfully.

Figure 4:
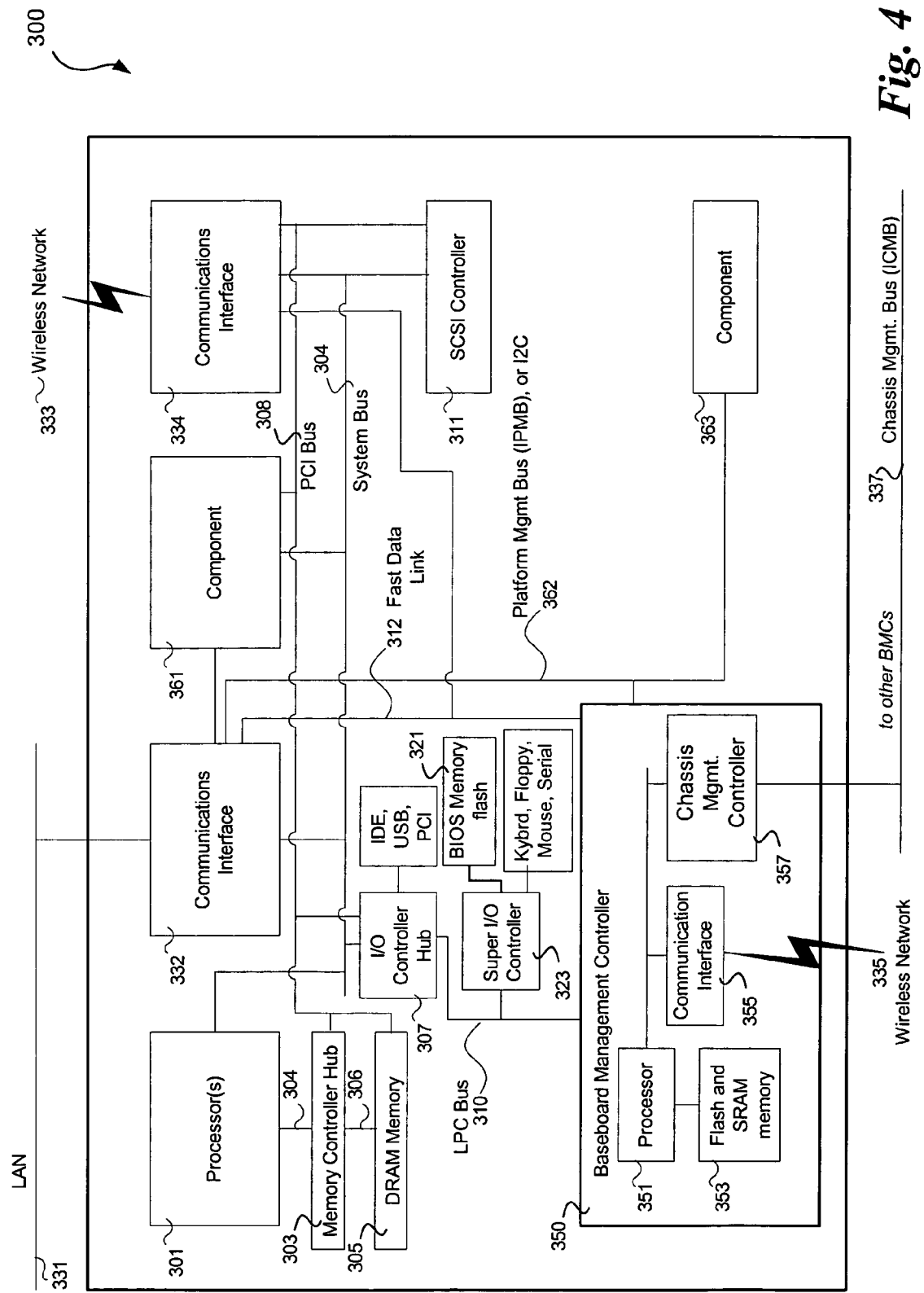
FIG. 4 is a block diagram showing an exemplary server with baseboard management controller (BMC) that may be used with at least one embodiment of the disclosed invention.

FIG. 4 is a block diagram of an exemplary server 300 as may be used in embodiments of the disclosed system and method. A server 300 has one or more processors 301. Processor 301 communicates with a memory controller hub (MCH) 303, also known as Northbridge, via the front side bus (system bus) 304. The MCH 303 communicates with system memory 305 via a memory bus 306. The MCH 303 may also communicate with an advanced graphics port (AGP, not shown) via a graphics bus. The processor communicates over the system bus 304 to an I/O controller hub (ICH, also known as the south bridge) 307. The MCH 303 communicates with the I/O controller hub (ICH) 307 via a peripheral component interconnect (PCI) bus 308.

A baseboard management controller 350 may be connected to the processor via a low pin count (LPC) bus 310. The BIOS image 321 is typically connected to the processor 301 via the LPC 310, as well, and may be connected via a super I/O controller (SIO) 323. The processor 301 may be operatively connected to a number of networks 331, 333. The processor may be operatively connected to a local area network (LAN) via a network port, for instance, a network interface card (NIC) 332 through the ICH 307. The processor may be connected to a wireless network 333 via a communication interface 334. The processor 301 may be connected to the BMC 350. The BMC may be connected to the BIOS flash device via a bidirectional buffer, allowing the BMC to have indirect access to the BIOS flash device for the purpose of updating the BIOS flash image. The BMC connects to other components 361, 363 via the platform management bus 362. The BMC 350 has its own processor 351 and memory 353. The BMC may be operatively connected to a variety of networks, for instance, it may be connected to a wireless network 335 via a communication interface 355. The BMC host interface is typically via the LPC interface 310 between the ICH 307, SIO 323 and BMC 350. The BMC chassis controller 357 operatively connects to a chassis management bus 337. The BMC may also be operatively connected to the LAN 331 via a fast data link 312 to communication interface 332. The Fast Data Link 312 may be a fast mode (400 KBs) or high-speed mode (3.4 Mbs) I2C bus interface, where a standard I2C is typically a 100 Kbs communication link. The BMC may also be connected to a wireless network 333 via the fast data link 312 through a communications interface 334.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for automatic firmware image recovery, comprising:

determining that a firmware image for server basic input output system (BIOS) code in a recipient system needs to be replaced;

sending a message over a network by a baseboard management controller on the recipient system, wherein the message requests a compatible replacement firmware image;

negotiating with a donor system based on a received acknowledgement that the donor system has a compatible image, using a predetermined policy to select the donor system from a set of at least one donor system having a compatible image, wherein negotiating with a donor system further comprises:

receiving a message request by at least one donor system in the network;

determining whether the donor system has a compatible image;

when the donor system has a compatible image, sending an acknowledgement and offer to the recipient system; and uploading a compatible image sent by the donor system to the recipient system; and updating the recipient system BIOS firmware with the uploaded compatible image from the baseboard management controller (BMC).

2. The method as recited in claim 1, wherein the network is selected from a group consisting of a wired network and a wireless network.

3. The method as recited in claim 1, wherein the message is sent via an out-of-band (OOB) connection.

4. The method as recited in claim 3, wherein the baseboard management controller residing on the recipient system is capable of communicating to donor systems via at least one communication means, wherein the communication means is selected from a group consisting of a local area network (LAN), a wireless access point, a wired inter-chassis management bus (ICMB), and a Bluetooth® protocol wireless network.

5. The method as recited in claim 1, wherein the donor system comprises a management console.

6. The method as recited in claim 1, wherein the donor system comprises a peer server in the network.

7. A machine accessible storage medium containing instructions that, when executed, cause a machine to:
  determine that a firmware image for server BIOS code in a recipient system needs to be replaced;
  send a message over a network by a baseboard management controller on the recipient system, wherein the message requests a compatible replacement firmware image;
  negotiate with a donor system based on a received acknowledgement that the donor system has a compatible image, using a predetermined policy to select the donor system from a set of at least one donor system having a compatible image, wherein negotiating with a donor system further comprises instructions to:
    receive an acknowledgement from at least one donor system in response to the message request sent over the network, where an acknowledgement is sent by each donor system having a compatible image;
    when more than one acknowledgement is received by the recipient system, select a donor system from the at least one donor system sending an acknowledgement based on the predetermined policy, and when only one acknowledgement is received, select the one donor system sending the acknowledgement;
    receive a compatible image from the selected donor system; and
  upload the compatible image sent by the selected donor system to the recipient system; and
  update the recipient system BIOS firmware with the uploaded compatible image from the baseboard management controller (BMC).

8. The machine accessible medium as recited in claim 7, wherein the network is selected from a group consisting of a wired network and a wireless network.

9. The machine accessible medium as recited in claim 7, wherein the message is sent via an out-of-band (OOB) connection.

10. The machine accessible medium as recited in claim 9, wherein the baseboard management controller residing on the recipient system is capable of communicating to donor systems via at least one communication means, wherein the communication means is selected from a group consisting of a local area network (LAN), a wireless access point, a wired inter-chassis management bus (ICMB), and a Bluetooth® protocol wireless network.

11. The machine accessible medium as recited in claim 7, wherein the donor system comprises a management console.

12. The machine accessible medium as recited in claim 7, wherein the donor system comprises a peer server in the network.

13. A machine accessible storage medium containing instructions that, when executed, cause a machine to:
  receive a message over a network, by a donor system, the message sent by a recipient system requesting an updated basic input output system (BIOS) firmware image, wherein the message is sent to at least one donor system on the network;
  determine by the donor system whether a compatible BIOS image is available to fulfill the request;
  when the donor system has a compatible BIOS image, negotiate with the recipient system which uses a predetermined policy to select the donor system from at least one donor system having a compatible BIOS image, wherein negotiating further comprises instructions to send an acknowledgement and offer to the recipient system when the donor system has a compatible BIOS image; and
  when the donor system is selected from the at least one donor system having a compatible BIOS image by the recipient system, upload the compatible BIOS image to the recipient system, by a baseboard management controller on the recipient system.

14. The machine accessible medium as recited in claim 13, wherein negotiating comprises instructions that cause the machine to:
  receive an acceptance acknowledgement for the offer.

15. A system for automatic firmware image update, comprising:
  a recipient server having at least one processor and a firmware hub, wherein a basic input output system (BIOS) code is stored in the firmware hub;
  a baseboard management controller (BMC) operatively coupled to the firmware hub, wherein the BMC comprises a BMC processor, a memory operatively coupled to the BMC processor, a communication interface enabling at least one of wireless network, chassis management bus and local area network communication; and
  executable code loaded in memory accessible to the BMC processor that when executed enables the BMC to:
    determine whether BIOS firmware requires update;
    send a request for an updated image via a network communication interface to at least one donor server on the network;
    negotiate with the at least one donor server for a compatible image, based on a received acknowledgement and offer that the at least one donor system has a compatible image, where the BMC is configured to use a predetermined policy to select a donor system from a set of the at least one donor system having a compatible image and returning an acknowledgement and offer in response to the request for an updated image;
    receive an update compatible image from the selected donor system; and
    load the updated compatible image in non-volatile memory in the firmware hub used for the system BIOS.

16. The system as recited in claim 15, wherein the request is sent via an out-of-band (OOB) connection.

17. The system as recited in claim 15, wherein the donor system comprises a management console.

18. The system as recited in claim 15, wherein the donor system comprises a peer server in the network.

19. A method for providing a firmware image, comprising:
  receiving a message over a network by a donor system on the network, the message sent by a baseboard management controller on a recipient system requesting an updated firmware BIOS image, wherein the message is sent to at least one donor system on the network;

determining by the donor system whether a compatible image is available to fulfill the request;

when the donor system has a compatible image, negotiating with the recipient system which uses a predetermined policy to select the donor system from the at least one donor system having a compatible image, wherein negotiating further comprises sending an acknowledgment and offer to the recipient system when the donor system has a compatible BIOS image, and receiving an acceptance acknowledgement for the offer; and when the donor system is selected from the at least and one donor system having a compatible image, uploading the compatible BIOS image to the recipient system, by the baseboard management controller.

20. The method as recited in claim 19, wherein the network is selected from a group consisting of a wired network and a wireless network.

21. The method as recited in claim 19, wherein the message is sent via an out-of-band (OOB) connection.

22. The method as recited in claim 19, wherein the donor system comprises a management console.

23. The method as recited in claim 19, wherein the donor system comprises a peer server in the network.

24. A method for automatic firmware image update, comprising:

determining that a basic input output system (BIOS) firmware image for a recipient system needs to be replaced;

sending a message, by the recipient system to a network comprising a plurality of donor systems, the message comprising a request for a compatible BIOS firmware image;

receiving an acknowledgement and offer from at least one of the plurality of donor systems in response to the request;

selecting, based on a predetermined policy, a donor system from the at least one donor system having sent an acknowledgement and offer;

retrieving a compatible updated BIOS image by a baseboard management controller (BMC) via an out-of-band connection from the selected donor system, wherein the BIOS firmware image for the recipient system resides on a firmware hub operatively coupled with the BMC; and updating the recipient system BIOS firmware with the retrieved compatible image.

25. The method as recited in claim 24, wherein updating is performed while in a power state selected from the group of power states consisting of direct current (DC) power on and DC power off.

26. The method as recited in claim 24, wherein retrieving a compatible updated BIOS image comprises identifying a predetermined location having a compatible image; and retrieving the compatible image from the predetermined location.

27. The method as recited in claim 26, wherein the predetermined location is selected from the group of locations consisting of a locally stored memory location, a locally stored non-volatile storage, a location accessible over a network, a storage location accessible by a predetermined processor, a web server, and an out of band input/output device accessible by the BMC while the recipient system is held in one of a reset state and inoperable state.

28. The method as recited in claim 27, wherein the locally stored non-volatile storage is one of a Universal Serial Bus (USB) device, and a Personal Computer Memory Card International Association (PCMCIA) flash card.

29. The method as recited in claim 24, wherein a baseboard management controller residing on the recipient system is capable of communicating to donor systems via at least one communication means, wherein the communication means is selected from a group consisting of a local area network (LAN), a wireless access point, a wired inter-chassis management bus (ICMB), and a Bluetooth® protocol wireless network.

30. The method as recited in claim 29, wherein the donor system comprises a management console.

31. The method as recited in claim 29, wherein the donor system comprises a peer server in the network.

* * * * *